(12) United States Patent
Drots et al.

(10) Patent No.: US 12,006,910 B2
(45) Date of Patent: Jun. 11, 2024

(54) ASSEMBLIES FOR WIND TURBINES AND METHODS

(71) Applicant: General Electric Renovables Espana, S.L., Barcelona (ES)

(72) Inventors: Thomas Drots, Nantes (FR); Josep Bosch-Collado, Barcelona (ES); Pablo Pozo Torres, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/322,146

(22) Filed: May 23, 2023

(65) Prior Publication Data

US 2023/0383724 A1 Nov. 30, 2023

(30) Foreign Application Priority Data

May 25, 2022 (EP) .................................. 22382495

(51) Int. Cl.
*F03D 1/06* (2006.01)
(52) U.S. Cl.
CPC ...... *F03D 1/0691* (2013.01); *F05B 2260/301* (2013.01)
(58) Field of Classification Search
CPC .................................................. F03D 1/0691
See application file for complete search history.

(56) References Cited

U.S. PATENT DOCUMENTS

| | | | |
|---|---|---|---|
| 7,360,310 B2 | 4/2008 | Bagepalli et al. | |
| 8,841,791 B2 | 9/2014 | Booth | |
| 10,487,581 B2 | 11/2019 | Wang et al. | |
| 11,434,877 B2 | 9/2022 | Hemmelmann et al. | |
| 2006/0152016 A1 | 7/2006 | Bywaters et al. | |
| 2010/0019502 A1 | 1/2010 | Pabst et al. | |
| 2013/0099503 A1 | 4/2013 | Bagepalli et al. | |
| 2013/0214540 A1 | 8/2013 | Gelmini et al. | |
| 2013/0292948 A1 | 11/2013 | Pallotti et al. | |
| 2014/0050591 A1 | 2/2014 | Munk-Hansen | |
| 2014/0147279 A1 | 5/2014 | Lind | |
| 2015/0016976 A1 | 1/2015 | Roer et al. | |
| 2017/0022966 A1 | 1/2017 | Therkildsen | |
| 2017/0030328 A1 | 2/2017 | Gudewer et al. | |
| 2021/0033073 A1* | 2/2021 | Hemmelmann | F03D 9/25 |

(Continued)

FOREIGN PATENT DOCUMENTS

| | | |
|---|---|---|
| CN | 201165940 Y | 12/2008 |
| CN | 103161680 A * | 6/2013 |

(Continued)

OTHER PUBLICATIONS

European Search Report Corresponding to EP21382804 dated Feb. 16, 2022.

(Continued)

*Primary Examiner* — Sabbir Hasan
(74) *Attorney, Agent, or Firm* — Dority & Manning, P.A.

(57) ABSTRACT

The present disclosure relates to an assembly comprising a rotor hub, a generator rotor, and a shaft for supporting the generator rotor on a stationary frame, wherein the rotor hub is configured to be removable from the generator rotor and the shaft without disassembling the generator rotor from the shaft. The present disclosure further relates to methods for assembly.

11 Claims, 5 Drawing Sheets

(56) References Cited

U.S. PATENT DOCUMENTS

2022/0325700 A1  10/2022  Kristoffersen
2022/0397094 A1  12/2022  Hernandez Ferre

FOREIGN PATENT DOCUMENTS

| CN | 103161680 B | 4/2015 |
|---|---|---|
| DE | 102004028746 A1 | 12/2005 |
| DE | 102004031329 A1 | 1/2006 |
| DE | 102018100864 A1 | 7/2019 |
| EP | 1925820 A1 | 5/2008 |
| EP | 1956235 A1 | 8/2008 |
| EP | 2698529 B1 | 10/2015 |
| EP | 3253966 A1 | 12/2017 |
| EP | 2853735 B1 | 10/2018 |
| WO | WO 01/42647 A2 | 6/2001 |
| WO | WO2014/032826 A1 | 3/2014 |

OTHER PUBLICATIONS

European Search Report Corresponding to EP22382495 dated Oct. 18, 2022.

\* cited by examiner

ASSEMBLIES FOR WIND TURBINES AND METHODS

FIELD

The present disclosure relates to assemblies for wind turbines and methods for providing a wind turbine assembly, and more particularly to an assembly for a wind turbine comprising a rotor hub configured to be removable from a generator rotor and a shaft.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

In a direct drive wind turbine, the rotor hub is directly (i.e. without a gearbox) coupled to the generator rotor. In order to support the weight of the generator rotor and hub, one or more rigid frames may be provided. In some wind turbine configurations, the hub (and generator rotor) is connected to a shaft. The shaft is arranged to rotate about a stationary frame. One or more bearings may be provided between the shaft and the stationary frame.

In some known configurations, the rotor hub may have a flange which is connected to a flange or coupling surface of the generator rotor with a plurality of bolts. The generator rotor in turn may be coupled to a flange or coupling surface of the shaft with another plurality of bolts, i.e. two bolted connections may be provided.

This type of two-by-two connection may require a relatively large contact area between components to fit all connection points. For that reason, the components generally comprise a relatively large and thick flange where the connections are performed. Thus, the large dimensions of the flanges due to the configuration of the connection points and because of the load requirements can lead a heavy assembly, increasing the inertia of the moving parts when these are set in rotation. The size and thickness of the flanges has a direct effect on the material cost of these components.

Consequently, the present disclosure provides methods and systems to at least partially overcome some of the aforementioned drawbacks providing a robust and versatile connection between rotor hub, generator rotor and shaft.

SUMMARY

In an aspect of the present disclosure, an assembly for a wind turbine is provided. The assembly comprises a rotor hub, a generator rotor and a shaft for supporting the generator rotor on a stationary frame. The assembly further comprises a plurality of main fasteners extending at least partially through the rotor hub, the generator rotor and the shaft. Further, the rotor hub is configured to be removable from the generator rotor and the shaft without disassembling the generator rotor from the shaft.

According to this aspect, the fact that the rotor hub is configured to be removable from the generator rotor and the shaft results in a versatile assembly. This configuration simplifies the installation and disassembly processes of the wind turbine rotary structure. Thus, according to this aspect, the rotor hub may be removed during uptower operations (e.g. maintenance) without the need of additional equipment to hold the generator rotor in place. At the same time no separate bolted flange connections are necessary between generator rotor and shaft.

In an additional aspect, a method for providing an assembly is provided. The method comprises providing a shaft and a generator rotor. Further, the method comprises coupling the support frame to the generator rotor with a plurality of auxiliary fasteners to form a shaft-generator rotor assembly, and coupling a wind turbine hub to the shaft-generator rotor assembly using main fasteners. The main fasteners extend through the shaft, the generator rotor and the wind turbine hub.

According to this additional aspect, this method makes it possible to first couple a generator rotor with a shaft, to later bring the wind turbine hub together with the shaft-generator rotor assembly. Therefore, this method allows splitting the assembly/disassembly of the aforementioned nacelle components and also reduces the lifting requirements of the lifting devices; i.e cranes or others. Further, the fact that the shaft-generator rotor assembly can be independent of the rotor hub allows commissioning the assembly and performing tests on the shaft-generator rotor assembly, such as heat run tests, without having to assemble the wind turbine rotor hub.

The shaft of the rotor assembly may be regarded as a rotatable support frame supporting the generator rotor.

Additional objects, advantages and features of embodiments of the present disclosure will become apparent to those skilled in the art upon examination of the description, or may be learned by practice of the invention.

DETAILED DESCRIPTION OF EXAMPLES

Figure 1:
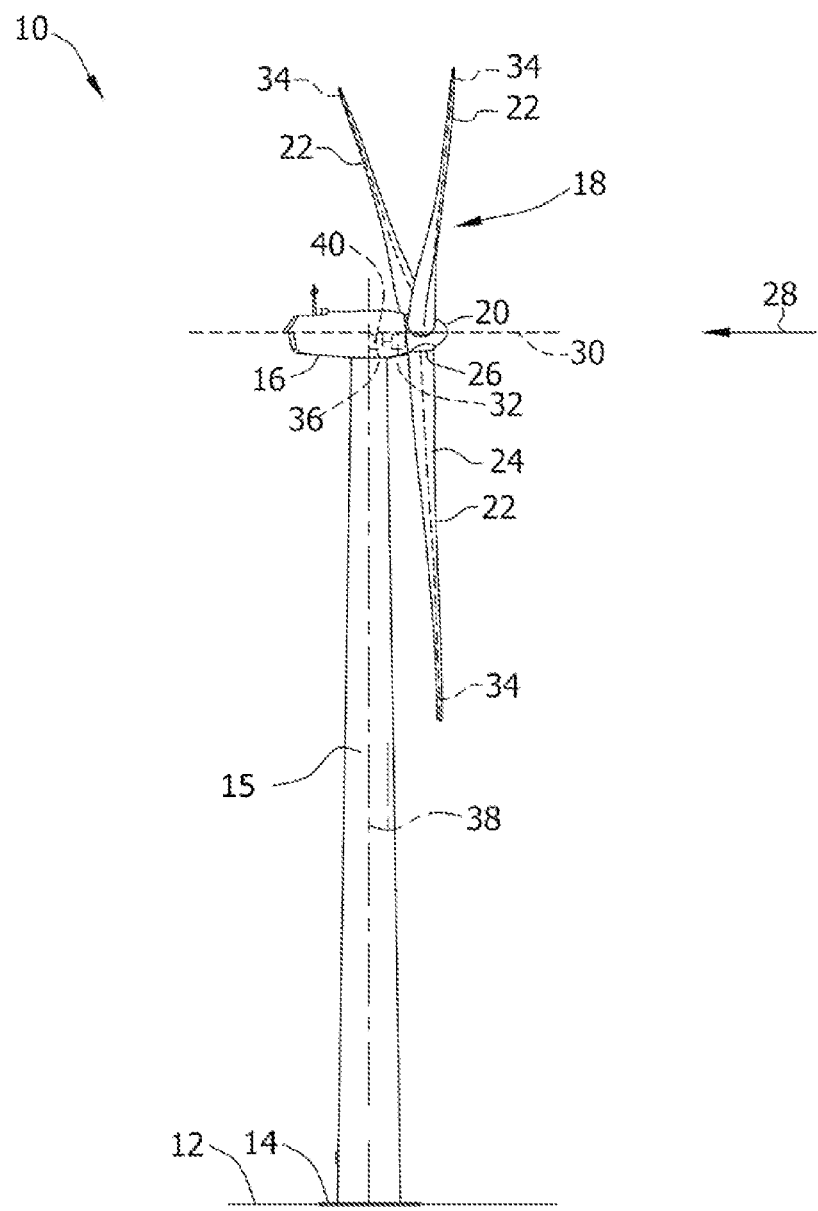
FIG. 1 schematically illustrates a perspective view of one example of a wind turbine.

Reference now will be made in detail to embodiments of the present teaching, one or more examples of which are illustrated in the drawings. Each example is provided by way of explanation only, not as a limitation. In fact, it will be apparent to those skilled in the art that various modifications and variations can be made without departing from the scope or spirit of the present teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
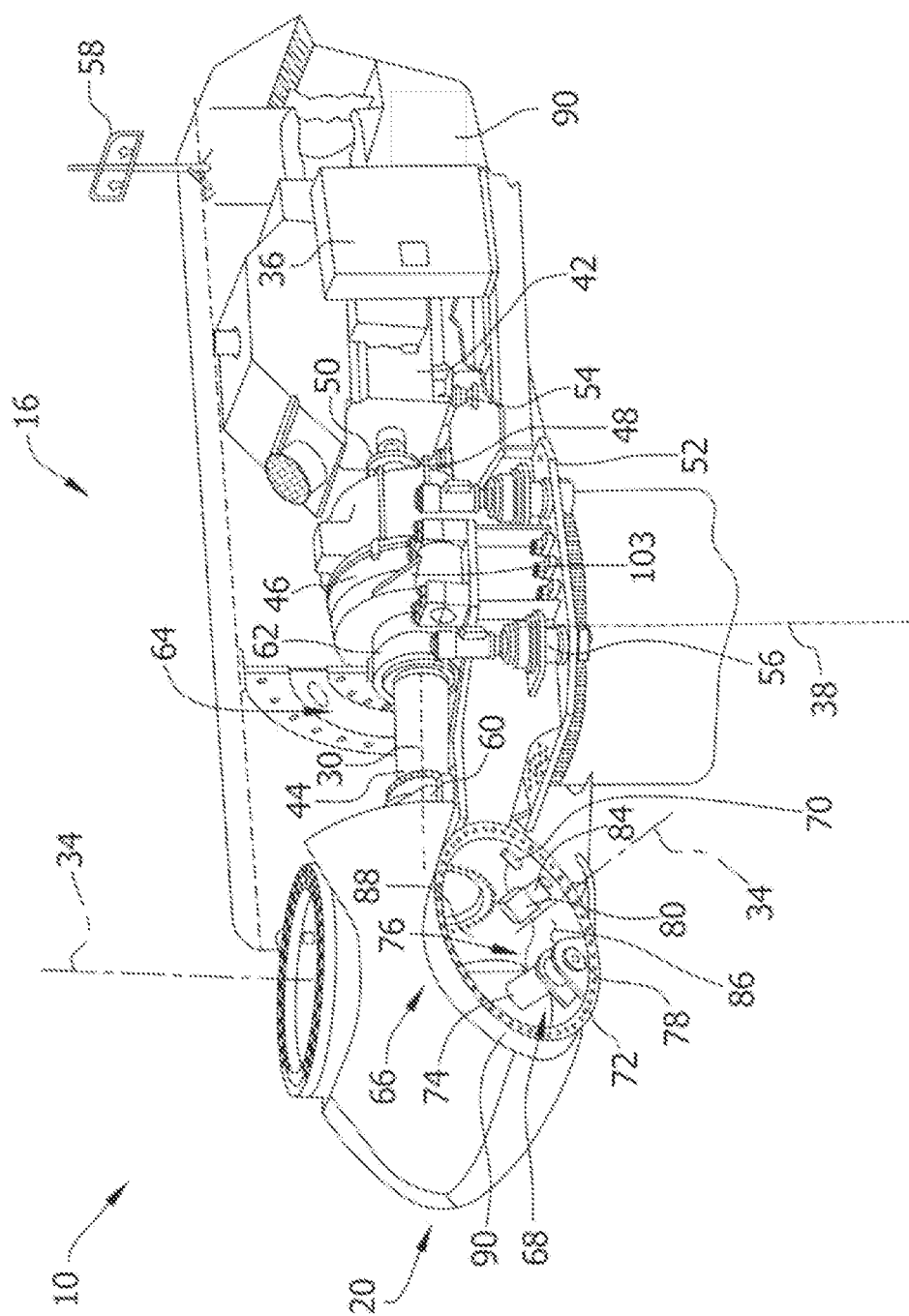
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface. It is noted that some technical features described in respect to FIG. 2 may also be present in direct drives wind turbines, as illustrated in FIG. 3.

Figure 3:
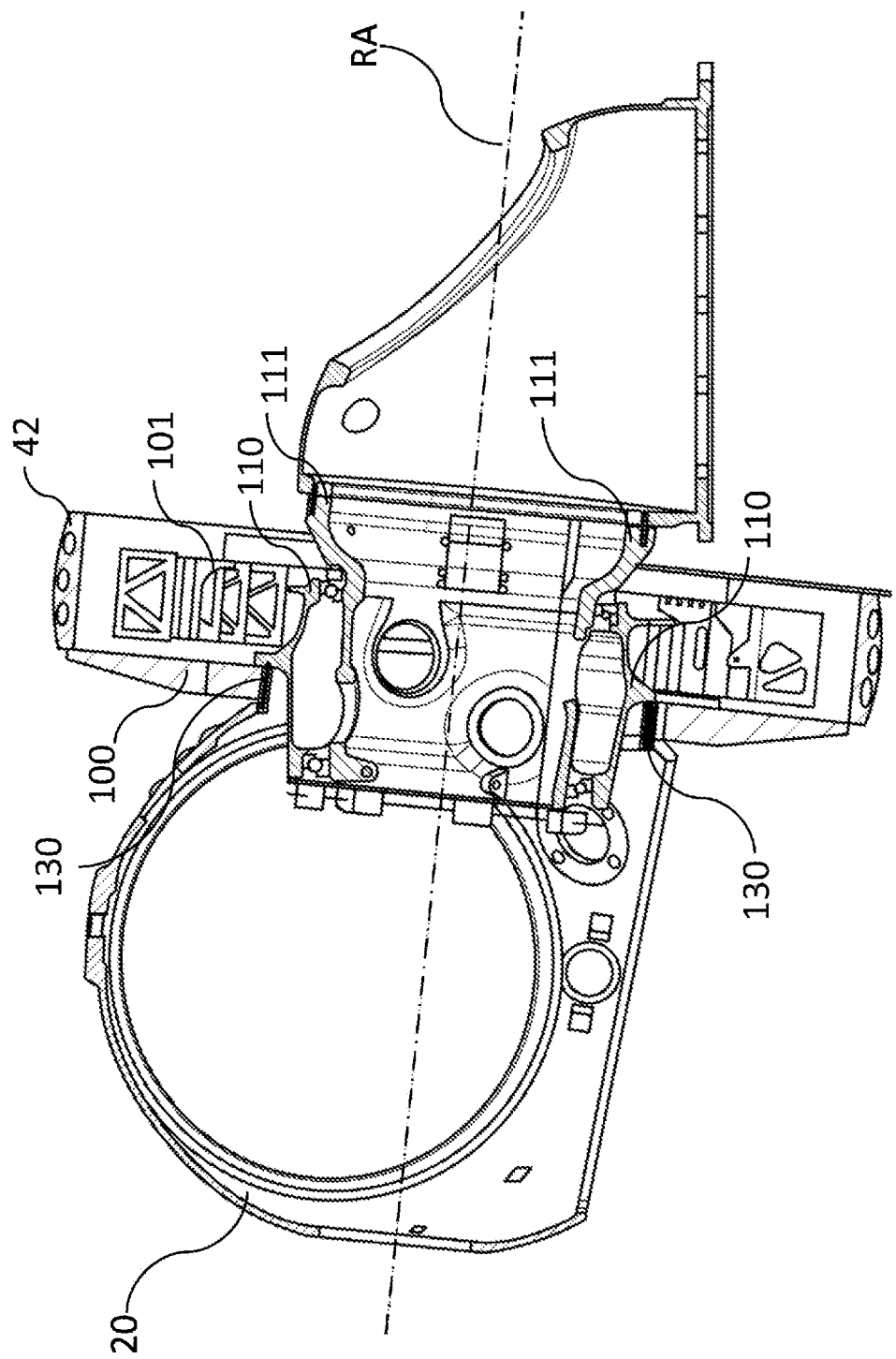
FIG. 3 schematically illustrates a cross-section view of an example of a wind turbine assembly.

FIG. 3 shows a cross-sectional view of an example of an assembly for a wind turbine. The assembly comprises a rotor hub 20, a generator rotor 100, and a shaft 110 for supporting the generator rotor 100 on a stationary frame 111. FIG. 3 schematically illustrates that the assembly further comprises a plurality of main fasteners 130 extending at least partially through the rotor hub 20, the generator rotor 100 and the shaft 110. The rotor hub 20 is configured to be removable from the generator rotor 100 and the shaft 110 without disassembling the generator rotor 100 from the shaft 110. Examples regarding the aforementioned connection are detailed in FIGS. 4 to 6.

Further, the example of FIG. 3 shows that the rotor hub 20, the generator rotor 100, and the shaft 110 comprise a common rotational axis RA. In this example, the generator rotor 100 radially surrounds the generator stator 101, but the assembly may alternatively comprise a generator rotor 100 located radially inside the generator stator 101. Similarly, the shaft 110 may be a single structure or may comprise a plurality of structures where other wind turbine components may be attached.

FIG. 3 also shows that the generator rotor 100 is fixed between a flange of the shaft 110 and the rotor hub 20. In other examples, the generator rotor 100 may be fixed on the opposite side of the rotor hub 20, i.e. with the shaft 110 fixed in between.

Further, although only two main fasteners 130 are illustrated in the cross-section view of FIG. 3, it should be noted that the number, arrangement, and type of fasteners coupling the wind turbine rotor hub 20, the generator rotor 100 and the shaft 110 may vary. For example, the plurality of main fasteners 130 may be bolts, wherein heads of the bolts may be arranged to contact and press the rotor hub 20 against the generator rotor 100 or the shaft 110. Fasteners such as studs with nuts or others can also be used.

As explained herein, the hub 20 may be removed from the wind turbine without having to disassemble the generator 100 and shaft 110. In absence of the hub (either after removing the hub, or before first installing the hub), the overall generator structure is maintained intact, and tests may be carried out. The overall generator structure in this example is formed by the generator rotary structure (including shaft 110, and the generator rotor 100), the generator stationary structure (including stationary frame 111, and the generator stator 101), and the bearings between the generator rotary structure and the generator stationary structure.

Figure 4:
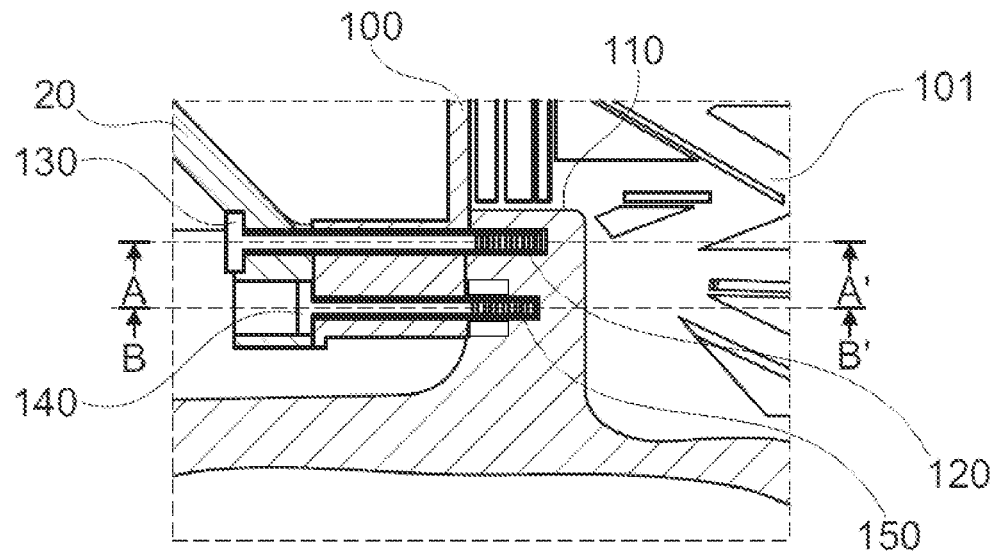
FIG. 4 schematically illustrates a detail view of the cross-section of the wind turbine assembly of FIG. 3.

FIG. 4 is a detailed view of the wind turbine assembly illustrated in FIG. 3 showing the coupling between the assembly components. This figure shows a contact region between the rotor hub 20 and the generator rotor 100, and another contact region between the generator rotor 100 and the shaft 110. As shown, the fasteners 130, 140 securing this coupling may be threaded bolts of different metrics.

The example illustrated in FIG. 4 shows that the main fasteners 130 may extend through through-holes in the rotor hub 20 and the generator rotor 100, and extend through blind holes in the shaft 110, i.e. the main fastener extends completely through the rotor hub 20 and generator rotor 100 and only partially through a flange of the shaft 110.

In other examples of wind turbine assemblies wherein the shaft 110 may be located between the rotor hub 20 and the generator rotor 100, the main fasteners 130 may extend through through-holes in the rotor hub 20 and the shaft 110 and through blind holes in the generator rotor 100. In yet further examples, the main fasteners may extend from the opposite direction towards the hub, i.e. from the support frame 110, through the generator rotor 100, and to a flange of the hub 20.

Additionally, as shown in the example of FIG. 4, the assembly may further comprise a plurality of auxiliary fasteners 140 configured to connect the generator rotor 100 to the shaft 110. The auxiliary fasteners 140 may have different length, and metric from the main fasteners 130. Both types of fasteners may be optimized for their specific use.

Further, the plurality of through-holes and blind holes of the wind turbine assembly may be equally spaced and radially distributed in at least one row around a rotation axis RA defined by the rotor hub 20, the generator rotor 100 and the shaft 110. The radial distribution of holes, and therefore fasteners, allows to split the load with radial symmetry maintaining the balance of the wind turbine assembly with respect to the rotation axis RA.

In the example of FIG. 4, the plurality of through-holes and blind holes are radially distributed in two rows around the rotation axis RA, namely a radially outer row, relative to the rotation axis RA, and a radially inner row, relative to the rotation axis RA. More specifically, the distribution of holes may be such as to define an inner row wherein a plurality of holes of the inner row are configured to receive auxiliary fasteners 140 to attach the generator rotor 100 to the shaft 110 and another plurality of holes of the outer row configured to receive main fasteners 130 to attach the rotor hub 20 to the generator rotor 100 and shaft 110. Even more specifically, the distribution of holes may be such as to define an outer row wherein all holes are configured to receive main fasteners 130 to attach the rotor hub 20 to the generator rotor 100 and to the shaft 110, and an inner row wherein all holes are configured to receive auxiliary fasteners only. Arranging the holes and fasteners in such a way may aid operators during unfastening processes, reducing overall time in maintenance and replacement tasks.

Figure 6:
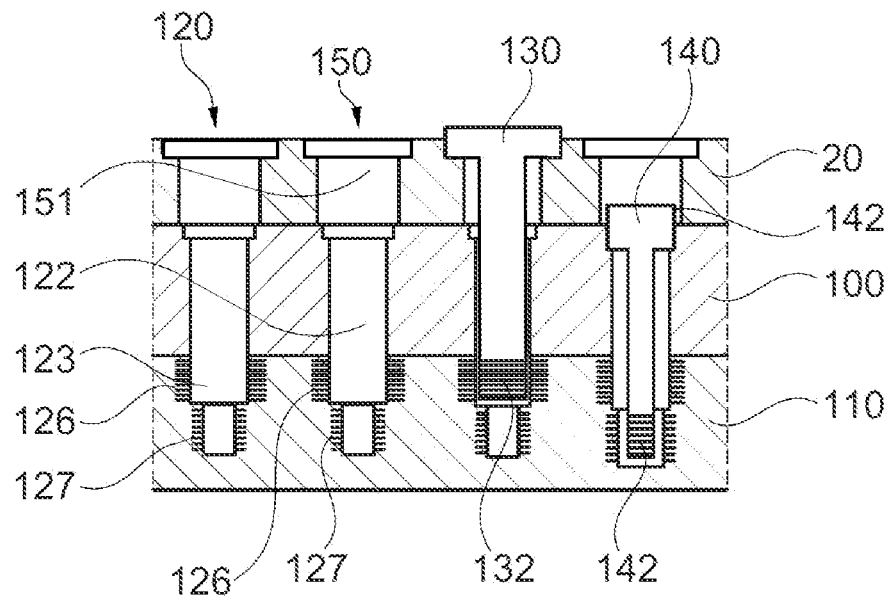
FIG. 6 schematically illustrates a radial cross-section across the radial plane B-B' in FIG. 4.

In yet further examples, the same holes may be configured for selectively receiving both main fasteners and auxiliary fasteners, as can be seen in FIG. 6.

The auxiliary fasteners 140 may be configured to temporarily connect the generator rotor 100 to the shaft 110 when the rotor hub 20 is disassembled from the generator rotor 100 and the shaft 110. This results in a versatile connection configuration, in which main fasteners 130 and auxiliary fasteners 140 can provide two different types of connection to facilitate maintenance and replacement tasks. As will be described with respect to methods of assembling, in a first stage, generator rotor 100 and shaft 110 may be attached using the (temporary) auxiliary fasteners 140. Then, when the rotor hub 20 is assembled to the generator rotor 100 and the shaft 110 using the main fasteners 130, the auxiliary fasteners 140 (or a selection thereof) may be removed.

FIG. 4 also shows that the plurality of through-holes of the rotor hub 20, through-holes of the generator rotor 100 and blind holes of the shaft 110, can be aligned to define holes 120, 150 configured to receive fasteners 130, 140 to attach the aforementioned components. Similarly, the alignment of the plurality of the through-holes of the generator rotor 100 and blind holes of the shaft 110 may also define a path of connection configured to receive fasteners 140 for connection of these two components independently from the rotor hub 20.

Figure 5:
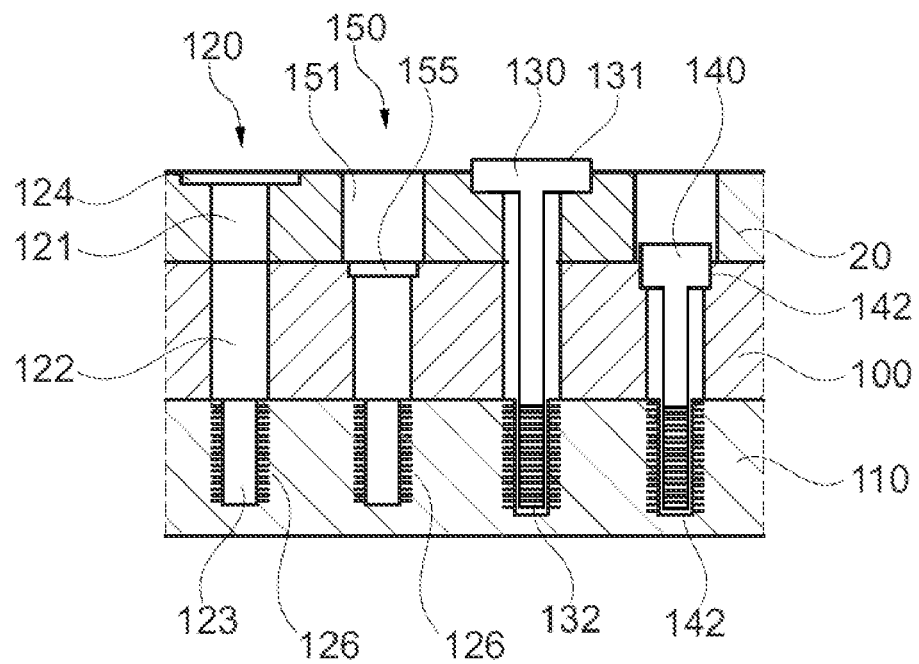
FIG. 5 schematically illustrates a radial cross-section across the radial plane A-A' in FIG. 4.

FIG. 5 is a radial projection of a cross-section across the radial plane A-A' depicted in FIG. 4 showing schematically an example of a configuration of holes 120, 150 and fasteners 130, 140. Other rows of holes 120, 150 may be arranged radially inside or outside (relative to the rotation axis RA) to the one illustrated.

FIG. 5 shows that the illustrated row of holes 120, 150 comprises a plurality of main holes 120 for receiving the main fasteners 130 and a plurality of auxiliary holes 150 for receiving the auxiliary fasteners 140. To aid in visualization, the first main hole 120 and auxiliary hole 150 (from left to right) have been illustrated without fasteners 130, 140 and the second main hole 120 and auxiliary hole 150 have been illustrated with the corresponding fasteners 130, 140. It is also illustrated in FIG. 5 that the main fasteners 130 may comprise a head 131 having a diameter that is greater than a minimum diameter of the plurality of through-holes 121, 151 of the rotor hub 20. The heads 131 of the main fasteners may rest against a surface of the hub in some examples. Or, as disclosed in FIG. 5, the main holes 120 may have a shape in which the heads 131 of the main fasteners can be received.

On the other hand, the auxiliary fasteners 140 may comprise a head 141 having a diameter that is smaller than a minimum diameter of the through-holes 151 of the rotor hub 20 but greater than the respective minimum diameter of the through-holes 122 of the generator rotor 100. Note that the main and auxiliary through-holes 121, 151 of the rotor hub 20 may be configured to receive the head 141 of the auxiliary fasteners 140.

Further, the shape of the through-holes 121, 122, 151 of the generator rotor 100 and of the rotor hub 20 may be adapted to mate with a head 141, 131 (or a portion thereof) of the auxiliary and main fasteners 140, 130, respectively. More precisely, the through-hole 122 of the generator rotor may comprise a local widening 155 to, at least, partially receive a head 142 portion of the auxiliary fasteners 140. Similarly, the through-hole 121 of the rotor hub may comprise a local widening 124 to partially receive a head 131 portion of the main fasteners 130.

In the example illustrated in FIG. 5, the assembly comprises holes with different morphologies, i.e. main holes 120 and auxiliary holes 150. However, as it is illustrated in FIG. 6, it is also possible for the assembly to comprise a plurality of holes extending at least partially through the rotor hub 20, the generator rotor 100 and the shaft 110, wherein the holes are configured to selectively receive main fasteners 130 and auxiliary fasteners 140. Thus, at least some of the holes may be configured to have substantially the same inner geometry. This would imply that these holes could receive main fasteners 130 and auxiliary fasteners 140 at different points during the wind turbine assembly, maintenance or replacement.

The blind holes 123 shown in FIG. 5 also comprise an inner thread 126 configured to match a thread of the fasteners 132, 142. As discussed, the inner thread 126 might have a different metric in main holes 120 than in auxiliary holes 150 to match each of the fasteners. Alternatively, all threads 126, 132, 142 may be the same to allow the interchange of fasteners.

FIG. 6 is a radial projection of a cross-section across the radial plane B-B' depicted in FIG. 4, showing schematically an example configuration of holes 120, 150 and fasteners 130, 140. As in FIG. 5, only two fasteners 130, 140 are shown.

In this example, the plurality of blind holes 123 may comprise one or more inner threads 126, 127. More specifically, the shaft 110 comprises blind holes 123 with two inner threads, a first inner thread 126 configured to receive and match a main fastener 130, and a second inner thread 127 configured to receive and match an auxiliary fastener 140. Note that the blind holes 123 may be either located in the generator rotor 100 or in the shaft 110, depending on the overall configuration of the wind turbine assembly.

In further examples (not illustrated in the figures), the shaft may be sandwiched between the generator rotor and hub. In this case, the blind holes might also be located in the generator rotor. The blind holes may be arranged either at the front "upwind" end of the assembly or at the rear "downwind" end. In yet further examples, the main and/or the auxiliary holes may be through-holes extending through all three components.

FIG. 6 also shows that the auxiliary holes 150 may comprise through-holes 151 of the rotor hub 20 having a minimum diameter which is greater than the minimum diameter of the corresponding through-holes 122 of the generator rotor 100. As previously discussed, the main holes 120 may also have the aforementioned feature if these are also intended to receive auxiliary fasteners 140 during certain assembly periods.

The present disclosure also provides a wind turbine assembly comprising a rotor hub 20, a generator rotor 100, a shaft 110, and a plurality of main and auxiliary fasteners 130, 140. The rotor hub 20 comprises a plurality of main and auxiliary holes 120, 150. The generator rotor 100 comprises a plurality of through-holes 122. The shaft 110 comprises a plurality of blind holes 123. Further, the plurality of main fasteners 130 extend through the main holes 120 of the rotor hub 20, the generator rotor 100 and into the shaft 110. Additionally, the auxiliary through-holes 151 are configured to receive auxiliary fasteners 140 configured to connect the shaft 110 to the generator rotor 100.

In an aspect of the disclosure, a wind turbine 10 comprising a wind turbine assembly according to any one of the aforementioned examples and technical features included is provided.

Figure 7:
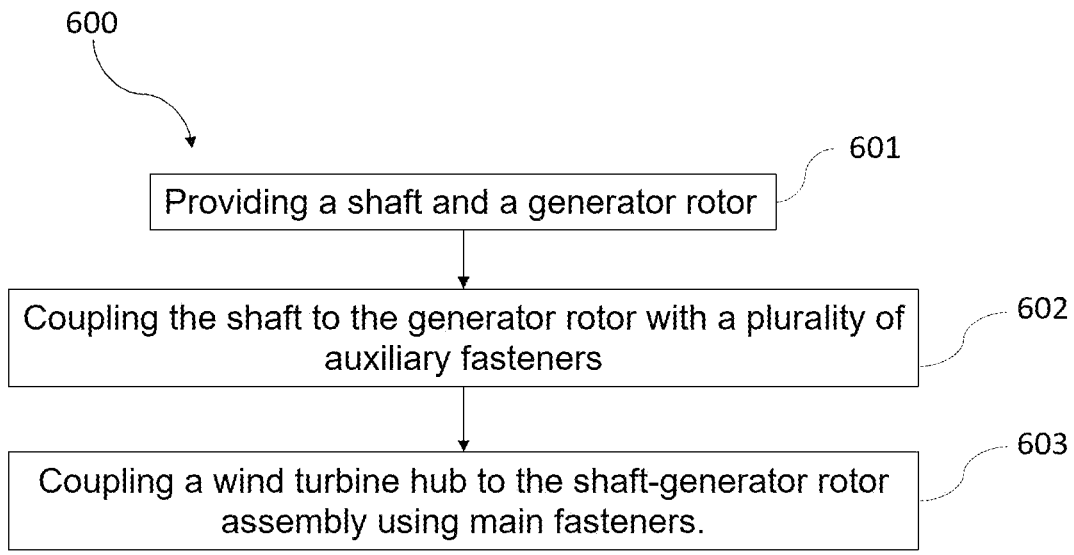
FIG. 7 illustrates a flowchart of an example of a method for providing a wind turbine assembly.

In another aspect of the disclosure, a method 600 for assembling is provided. Method 600 is suitable for providing an assembly for a wind turbine according to the technical features disclosed in the present disclosure. Method 600 is schematically illustrated in FIG. 7.

The method comprises, at block 601, providing a shaft 110 and a generator rotor 100. The method 600 also comprises, at block 602, coupling the support frame 110 to the generator rotor 100 with a plurality of auxiliary fasteners 140 to form a shaft-generator rotor assembly. Further, the method 600 comprises, at block 603, coupling a wind turbine hub 20 to the shaft-generator rotor assembly using main fasteners 130 which extend at least partially through the shaft 110, the generator rotor 100 and the wind turbine rotor hub 20.

According to this aspect, the method allows mounting the shaft-generator rotor assembly independently from the wind turbine rotor hub 20. This independence reduces the overall complexity of the assembly and disassembly operations from a wind turbine. Further, it also allows performing tests on site and to validate the shaft-generator rotor assembly prior to coupling the rotor hub 20.

In examples, the method 600 may further comprise providing a rotor hub comprising main through-holes 121 and auxiliary through-holes 151 to receive main fasteners 130 and auxiliary fasteners 140, respectively. Additionally, the method 600 may also comprise removing at least a selection of the plurality of the auxiliary fasteners. Further, the method 600 may comprise coupling one or more main fasteners to the auxiliary through-holes vacated by the removal of auxiliary fasteners. These additional steps of the method allow securing the wind turbine assembly with main fasteners, providing a more secure coupling before operating the wind turbine.

Further, the method 600 may also comprise the steps of decoupling all the main fasteners 130 to release the rotor hub 20 from the shaft-generator rotor assembly, and bringing downtower the rotor hub 20 for maintenance or replacement tasks.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An assembly for a wind turbine comprising:
   a rotor hub;
   a generator rotor;
   a shaft supporting the generator rotor on a stationary frame;
   a plurality of main fasteners extending at least partially through the rotor hub, the generator rotor, and the shaft;
   wherein the rotor hub is removable from the generator rotor and the shaft by removing the main fasteners without disassembling the generator rotor from the shaft; and
   wherein the main fasteners extend through through-holes in the rotor hub and the generator rotor, and extend into blind holes in the shaft.

2. The assembly according to claim 1, wherein the main fasteners comprise bolts with heads, wherein the heads contact and press the rotor hub against the generator rotor or the shaft.

3. The assembly according to claim 1, wherein the blind holes comprise an inner thread.

4. The assembly according to claim 1, wherein the through-holes and the blind holes are equally spaced and radially distributed in at least one row around a rotation axis that is common to the rotor hub, the generator rotor, and the shaft.

5. The assembly according to claim 1, further comprising a plurality of auxiliary fasteners configured to connect the generator rotor to the shaft.

6. The assembly according to claim 5, wherein the auxiliary fasteners are configured to temporarily connect the generator rotor to the shaft when the rotor hub is disassembled from the generator rotor and the shaft.

7. The assembly according to claim 5, wherein auxiliary holes of the generator rotor mate with a head portion of the auxiliary fasteners and the through-holes of the rotor hub mate with a head portion of the main fasteners.

8. The assembly according to claim 5, comprising a plurality of auxiliary holes extending through the rotor hub, the generator rotor, and into the shaft, wherein the auxiliary holes are configured to selectively receive the auxiliary fasteners.

9. The assembly according to claim 8, wherein the auxiliary fasteners comprise a head having a diameter that is smaller than a minimum diameter of the auxiliary holes through the rotor hub and greater than a minimum diameter of the auxiliary holes through the generator rotor and into the shaft.

10. An assembly for a wind turbine comprising:
a rotor hub;
a generator rotor;
a shaft supporting the generator rotor on a stationary frame;
a plurality of main fasteners extending at least partially through the rotor hub, the generator rotor, and the shaft;
wherein the rotor hub is removable from the generator rotor and the shaft by removing the main fasteners without disassembling the generator rotor from the shaft;
a plurality of auxiliary fasteners configured to connect the generator rotor to the shaft; and
wherein the rotor hub comprises a plurality of main holes for receipt of the main fasteners and a plurality of auxiliary holes for receipt of the auxiliary fasteners.

11. The assembly according to claim 10, wherein the auxiliary holes comprise through-holes in the rotor hub having a minimum diameter that is greater than a diameter of holes in the generator rotor or the shaft.

* * * * *